June 14, 1927.
J. W. HEINEY
1,631,961
RADIATOR MOUNT
Filed July 18, 1923
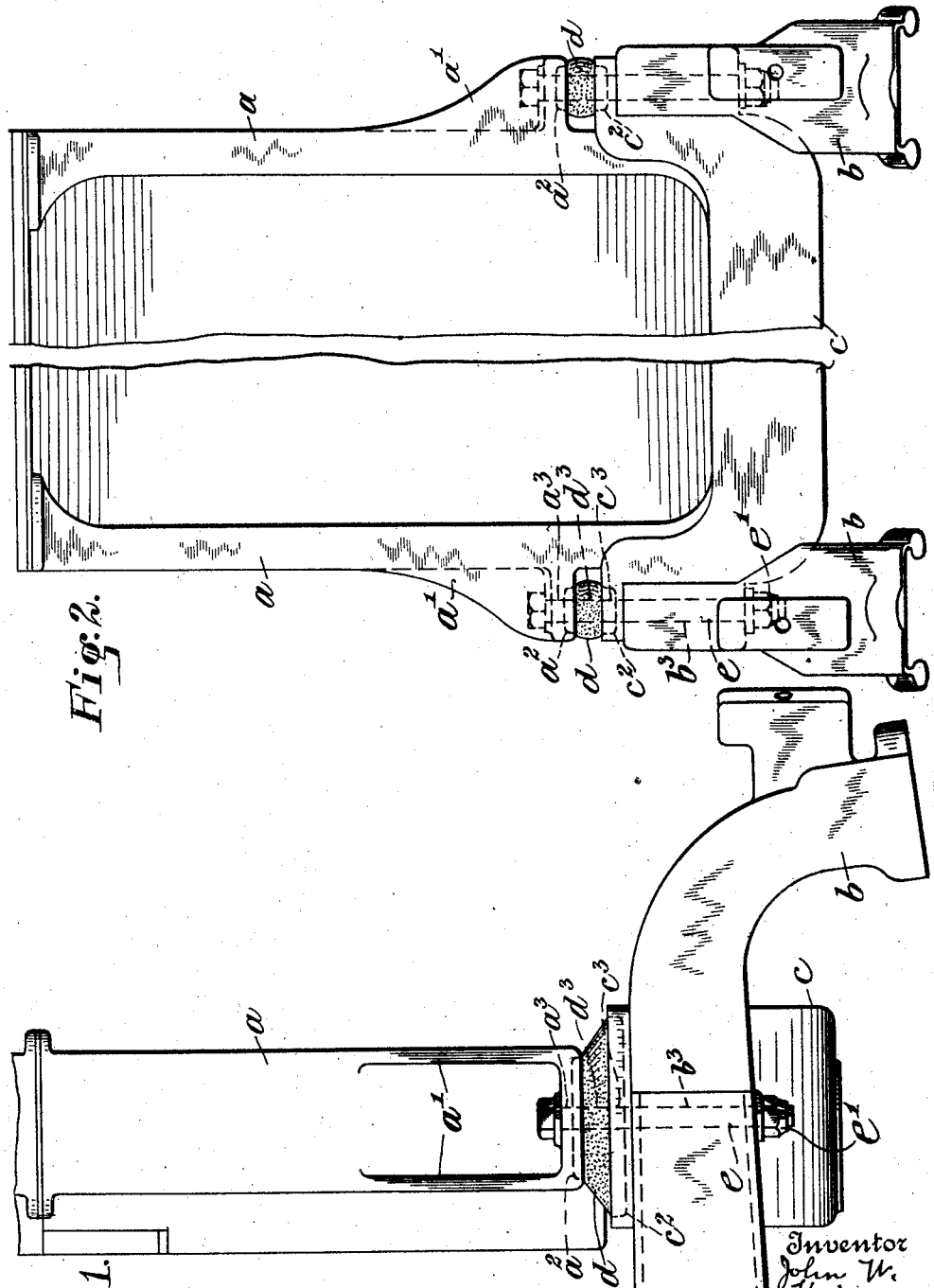

Patented June 14, 1927.

1,631,961

UNITED STATES PATENT OFFICE.

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE.

RADIATOR MOUNT.

Application filed July 18, 1923. Serial No. 652,257.

This invention relates to a non-metallic yielding mounting for motor vehicle radiators.

It has been proposed, heretofore, to mount radiators upon the frames of motor vehicles by means of metallic springs which tended to absorb shocks received from the vehicle frame. Such a mounting of the radiator has not been completely satisfactory, however, because the metal springs permitted a certain amount of relative motion of the radiator with respect to the frame; the springs deteriorated with use and weather so that, in time, adjustment and replacement was necessary; and metallic springs to do the necessary work, have had to be relatively stout and so suffered in resiliency and have not absorbed vibrations.

The present invention seeks to provide a mounting for a radiator upon a motor vehicle frame which will absorb any shocks and vibrations received from the frame and overcome relative movement between the radiator and the frame. It is also sought to do away with a metallic mounting which is subject to deterioration and wear and the objectionable noises resulting therefrom in use.

According to the present invention the radiator is supported upon the vehicle frame by means of a wholly non-metallic yielding mounting which absorbs shocks and vibrations and prevents their transmission from the frame to the radiator. By the use of such a mounting, a metal to metal joint is avoided with its accompanying deterioration, wear and objectionable noise. The non-metallic yielding material is preferably interposed between the radiator and the frame under compression in order to increase the resiliency and strength of the material. In the preferred embodiment of the invention seats are formed on the radiator for one or more blocks of non-metallic yielding material such as rubber and corresponding seats are formed on an element of the vehicle frame and the radiator and frame are then secured together by means of bolts or the like which exert compression upon the block or blocks. By disposing the bolts on either side of the radiator in the same transverse plane any tendency of the radiator to sway from side to side or turn about a vertical axis is combated and by extending the blocks for a substantial distance in the longitudinal direction of the vehicle, support for the radiator in the direction of its depth is provided and any tendency it may have to sway in a direction from front to rear is resisted.

A preferred embodiment of the invention will now be described more fully with reference to the accompanying drawings in which—

Figure 1 is a fragmental side view showing the yielding mounting on one side of the radiator and Figure 2 is a fragmental view showing the yielding mounting at both sides of the radiator looking from the front of the vehicle.

In the drawings so much of the radiator and vehicle frame is illustrated, in a conventional manner, as is necessary to an understanding of the invention. The radiator frame is indicated at $a$, the longitudinal side members of the chassis frame at $b$ and a cross frame member at $c$. A bracket $a'$ is secured to or formed integral with the radiator frame and at either side thereof. Each bracket is formed with a seat $a^2$ for a block $d$ of non-metallic yielding material, such as rubber, interposed between the bracket $a'$ and a corresponding seat $c^2$ on the cross member $c$. The seats $a^2$, $c^2$, in the preferred embodiment may be formed as recesses in the opposed faces of the bracket and cross member respectively. Means are provided to connect the bearing surfaces so that the block $d$ may be maintained under compression. The bracket $a'$, transverse member $c$ and side rail $b$ are bored as at $a^3$, $c^3$ and $b^3$ respectively. The apertures are in register with one another and permit the passage of a bolt $e$, which may, if desired, also pass through an aperture $d^3$ in the rubber block, to rigidly connect the radiator, cross frame member and side frame member. In this manner bolt $e$ not only secures the radiator to the chassis frame but serves as the connecting means for the cross frame member and side frame member. By taking up on the nut $e'$ the block $d$ may be placed under the desired compression to increase the strength and resiliency of the rubber and thus increase the capacity of the rubber to absorb shocks and vibrations. A further feature which adds to the stability of the radiator is the disposition of the fastening means and the cushioning devices. The two bolts $e$, being disposed in the same transverse plane, resist any movement of the radiator in a direction transverse to the longitudinal axis of the vehicle. It is also advantageous to give the radiator maximum support from front to rear in order to resist any tendency it may have to sway in that direction. For this purpose the bracket $a'$ is so formed that its seat $a^2$ extends at least for the depth of the radiator as illustrated and the block is of a corresponding dimension. To further resist swaying of the radiator in this direction the block is so formed that the corresponding dimension of the lower surface of the block is greater than this dimension of the upper surface and the block is tapered both front and rear. It will be readily appreciated that with this taper the block is enabled to still further resist diagonal stresses set up by the radiator and overcome any tendency of the radiator to sway in a direction from front to rear.

By this construction the radiator is so mounted upon the vehicle frame that all relative movement between them is resisted; all shocks received from the frame are absorbed by the cushioning blocks and are not transmitted to the radiator; and there is no metal to metal contact between the radiator and vehicle frame so that there is no possibility of wear of metal parts and no replacement of parts is required.

Various modifications may be made in the size, shape and material of the block used to absorb vibrations as well as the method of mounting the same and its relative position with respect to the radiator without departing from the spirit and scope of the invention and no limitation is intended other than as indicated in the appended claim.

What I claim is:

A wholly non-metallic connection and support interposed between a vehicle frame and a radiator, comprising a block of yielding non-metallic material at either side of the radiator having parallel upper and lower faces, the lower face of said block being greater in area than the upper face and the forward and rearward superficial areas of said block extending downwardly and outwardly, co-operating depressed seats for the block on the vehicle frame and radiator to receive snugly the bottom and top of the block, respectively, and a bolt passing through the seats and the block to maintain the block under compression and against displacement whereby pivotal movement of the radiator about the support will cause a distortion of that portion of the block between the two seats and added resistance will be applied to resist such pivotal movement.

This specification signed this 6th day of July, A. D. 1923.

JOHN W. HEINEY.